Figure 1:
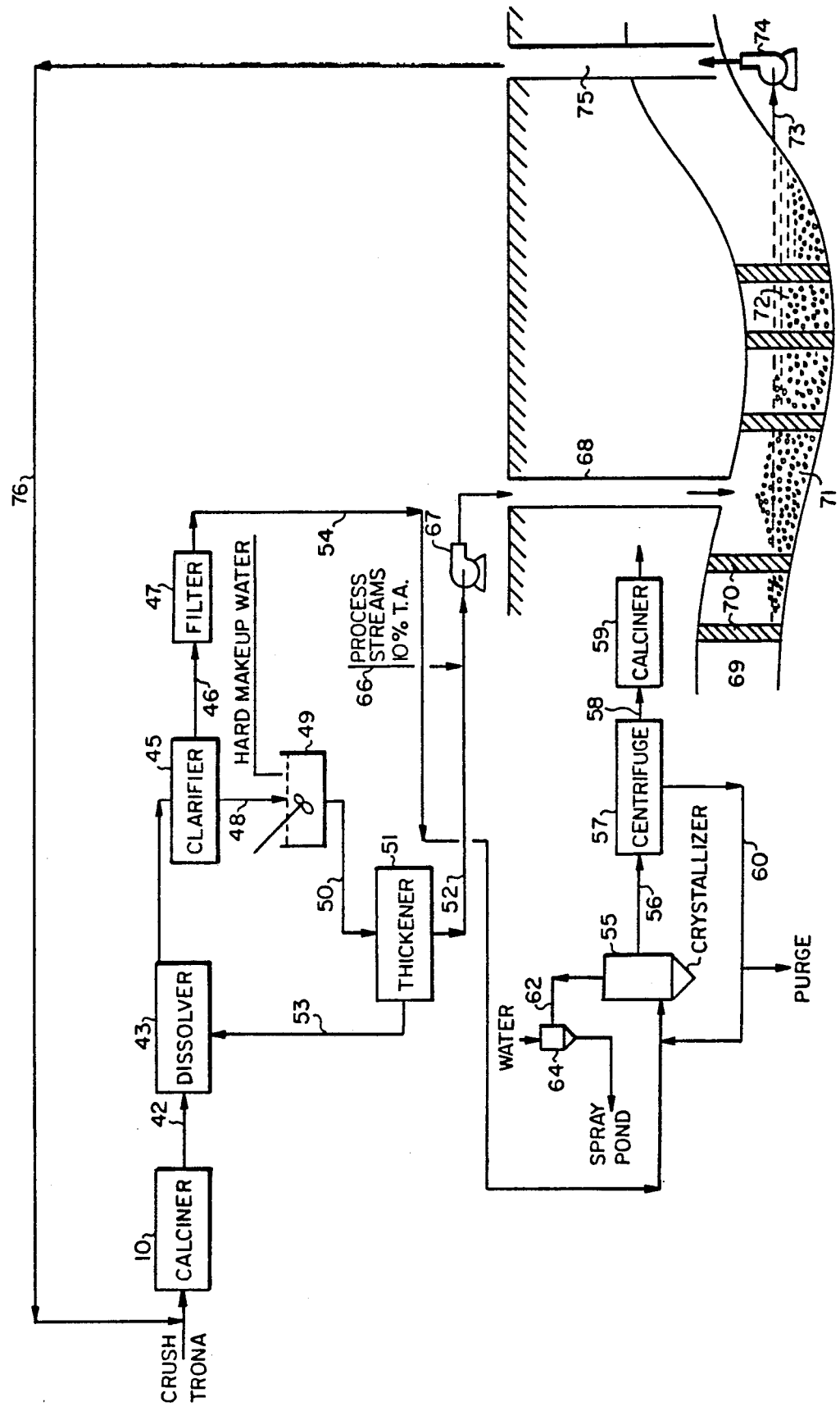

United States Patent [19]

Frint et al.

[11] Patent Number: 5,043,149
[45] Date of Patent: Aug. 27, 1991

[54] SODA ASH PRODUCTION

[75] Inventors: William R. Frint; Michael M. Bithell; William G. Fischer, all of Green River, Wyo.

[73] Assignee: FMC Corporation, Philadelphia, Pa.

[21] Appl. No.: 574,837

[22] Filed: Aug. 29, 1990

[51] Int. Cl.$^5$ .............................................. C22B 26/10
[52] U.S. Cl. ............................ 423/206 T; 23/302 T
[58] Field of Search .................... 423/206 T; 23/302 T

[56] References Cited

U.S. PATENT DOCUMENTS

| | | | |
|---|---|---|---|
| 3,050,290 | 8/1962 | Caldwell et al. | 423/206 T |
| 3,655,331 | 4/1972 | Seglin et al. | 423/206 T |
| 3,792,902 | 2/1974 | Towell et al. | 423/206 T |
| 4,039,618 | 8/1977 | Gancy et al. | 423/206 T |
| 4,044,097 | 8/1977 | Gancy et al. | 423/206 T |
| 4,344,650 | 8/1982 | Pinsky et al. | 423/206 T |
| 4,401,635 | 8/1983 | Frint | 423/206 T |

Primary Examiner—Theodore Morris
Assistant Examiner—Edward Squillante
Attorney, Agent, or Firm—Frank Ianno; Robert L. Andersen

[57] ABSTRACT

Process for disposing of insoluble tailings that remain when solubilizing uncalcined or calcined trona in the process of producing soda ash, in which the tailings are slurried with water or waste solutions of sodium carbonate and/or sodium bicarbonate, pumping the slurry into a well connected to an underground mined-out cavity with sufficient pressure to prevent build-up of tailings from plugging the bottom of the well opening, dispersing and settling said tailings in the cavity, removing a liquor from said cavity whose concentration of sodium carbonate and/or sodium bicarbonate has been increased and recovering such enriched liquor for use in the manufacture of sodium-containing chemicals such as soda ash.

6 Claims, 1 Drawing Sheet

SODA ASH PRODUCTION

This invention relates to an improved process for recovering sodium chemicals, including sodium carbonate and/or sodium bicarbonate values from underground ore formations, especially trona, useful in manufacturing soda ash, sodium bicarbonate, caustic soda and other sodium chemicals and for disposing of tailings resulting from such ore processing, in an environmentally acceptable manner, with improved and efficient ore recovery.

In southwestern Wyoming, in the vicinity of Green River, a vast deposit of crude, mineral trona ($Na_2CO_3 \cdot NaHCO_3 \cdot 2H_2O$) which lies some 800 to 3000 feet beneath the surface of the earth has been discovered. Other such underground deposits of trona have also been discovered in Turkey and China. The main trona bed at Green River is present as a seam about 12 feet in thickness at approximately the 1,500 foot level analyzing about 90% trona. The Green River trona beds cover 1000 square miles and consist of several different beds which generally overlap each other and are separated by layers of shale. In some areas, the trona beds occur over a 400 foot stratum with ten or more layers comprising 25% of the total stratum. The quality of the trona varies greatly, of course, depending on its location in the stratum.

A typical analysis of this crude trona being mined at Green River, Wyoming, is as follows:

| Typical Crude Trona Analysis | |
|---|---|
| Constituent | Percent |
| Sodium Sesquicarbonate | 90.00 |
| NaCl | 0.1 |
| $Na_2SO_4$ | 0.02 |
| Organic Matter | 0.3 |
| Insolubles | 9.58 |
| | 100.00 |

As seen in the above analysis, the main constituent of crude trona is sodium sesquicarbonate. The amount of impurities, primarily shale and other nonsoluble materials, is sufficiently large that this crude trona cannot be directly converted into products which can be utilized in many commercial processes. Therefore, the crude trona is normally purified to remove or reduce the impurities before its valuable sodium content can be sold commercially as: soda ash ($Na_2CO_3$), sodium bicarbonate ($NaHCO_3$), caustic soda ($NaOH$), sodium sesquicarbonate ($Na_2CO_3 \cdot NaHCO_3 \cdot 2H_2O$), a sodium phosphate ($Na_5P_3O_{10}$) or other sodium-containing chemicals.

One major use for the crude trona is to convert and refine it into soda ash. In order to convert the sodium sesquicarbonate content of the trona to soda ash in commercially feasible operations, two distinct types of processes are employed. These are the "Sesquicarbonate Process" and the "Monohydrate Process".

The "Sesquicarbonate Process" for purifying crude trona and producing a purified soda ash is by a series of steps involving: dissolving the crude mined trona in a cycling, hot mother liquor containing excess normal carbonate over bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out as the stable crystal phase, recycling the mother liquor to dissolve more crude trona and calcining the sesquicarbonate crystals at a temperature sufficient to convert same to soda ash.

A more direct and simplified method which was subsequently developed is the "Monohydrate Process" which yields a dense, organic-free soda ash by a series of steps involving: calcining the crude trona at a temperature of 400° C. to 800° C. to convert it to crude sodium carbonate and removing the organics by oxidation and distillation, dissolving the crude sodium carbonate in water, clarifying the resulting sodium carbonate solution to remove insolubles as muds therefrom, filtering the solution, evaporating water from the clarified and filtered sodium carbonate solution in an evaporator circuit, crystallizing from the pregnant mother liquor sodium carbonate monohydrate, calcining the monohydrate crystals to produce dense, organic-free soda ash and recycling the mother liquor from the crystals to the evaporating step.

The calcination of the crude trona in the above process has a threefold effect. First, by calcining between a temperature of about 400° C. to 800° C., the organic matter present in the crude trona is removed. Secondly, the calcination effects a conversion of the bicarbonate present in the crude trona to sodium carbonate. Lastly, the crude sodium carbonate resulting from the carbonation has a greater rate of solubility then the crude trona. A comparison of the solubility rates set forth in Table I.

TABLE I

| | Percent $Na_2CO_3$ in Solution | |
|---|---|---|
| Time, Minutes | Crude Trona | Crude Sodium Carbonate |
| 1 | 13 | 31.5 |
| 2 | 17 | 32.5 |
| 3 | 18.5 | 32.5 |
| 5 | 19 | 32.0 |

The increase in the rate of solubility results in a great saving in the time required for completing a cycle in the process and results in increased production of soda ash.

In both the "Sesquicarbonate Process" and "Monohydrate Process" substantial amounts of insolubles which do not dissolve in the dissolving solutions must be separated from the dissolved raw trona or dissolved calcined trona, respectively, in these processes. The separation normally takes place in a clarifier where the insolubles settle to the bottom as muds leaving a clarified solution of raw or calcined trona which can be sent downstream to a crystallizer circuit for recovery of a crystallized product. These muds are preferably contacted with raw make-up water, required for the dissolver circuit, to soften the make-up water before being used to dissolve the trona ore as described in U.S. Pat. No. 3,131,996 issued to Leonard Seglin, et al. After such clarification and make-up water softening step, described above, the muds and softened water are usually passed to a thickener where the muds are concentrated and thickened. A softened water solution recovered from the thickener is returned to the dissolver circuit and the thickened muds, often called tailings, are sent to surface disposal impoundments where they are contained.

Although the insolubles amount to only a small fraction, typically about 10% of the mined trona, it becomes a sizeable quantity of total disposable tailings on the order of 350,000 tons/year when operating a plant producing two million tons of soda ash per year. Such tailings must, of course, be disposed of in an environmentally acceptable manner.

One obvious method of tailings disposal would be to place the tailings back in the environment from whence they originated. Since the tailings only comprise about 10% the volume of material removed in the mining process, there exists ample space in the mine to permanently store the tailings. However, many problems exist in separating tailings from most or all of the associated water solution in contact with the insolubles, transporting the tailings back down the mine shafts, conveying them underground to the mined-out areas and placing them in abandoned areas of the mine which may no longer have roof bolts and in which subsidence of the area has commenced. Such abandoned areas can only be entered at great hazard because of roof falls and methane gas build-up.

Further, if the tailings are not almost dry, the moisture or solution will drain off from the tailings and spread throughout the mine, creating a messy and hazardous situation unless the liquid is confined and/or collected and returned to the surface. Again, entering an abandoned mine area to collect or confine such liquid is usually too hazardous for normal practice.

Disposal of tailings in the active mine area is another option. However, the problem of trying to transport tailings back into the mine while removing ore from the mined areas simultaneously would create serious organizational problems and production interference.

Such problems associated with attempts at conventional underground disposal of trona tailings make such procedures economically unsound and difficult to implement.

It has now been found that such tailings can be disposed of underground by slurrying the tailings with sufficient waste process streams or water to permit the slurry to be pumped, pumping the slurry into a well connected to an underground mined-out cavity in a trona bed with sufficient pressure to prevent build-up of tailings from blocking the bottom of the well opening, continuing to pump said tailings slurry into said cavity, dispersing and settling said tailings in said cavity, removing liquor from said cavity whose sodium carbonate and/or sodium bicarbonate concentration (hereinafter termed, "total alkali" or "TA") has increased as the result of dissolving trona from said cavity, and recovering said liquor with increased TA values for use in the manufacture of sodium-containing chemicals.

This process unexpectedly achieved two desired results. Initially, it permitted tailings to be conveyed and introduced into an otherwise inaccessible underground cavity through a cased injection well without clogging its lower opening into the underground cavity. Apparently, by introducing such tailings with water in slurry form and under a high static head, the tailings slurry can be dispersed over a wide area underground without forming a cone-shaped build-up of tailings below the well opening that chokes off the opening of the injection well leading into the cavity.

The second unexpected finding is that the solution used to slurry up the tailings for injection into the underground cavity increases substantially in TA values after it has remained in the underground cavity by dissolving trona it contacts. This would not have been anticipated because it is known that when water is used to dissolve trona, from underground formations, this incongruent dissolving double salt, forms a residual dissolution barrier on the trona surface. Residual trona insolubles and sodium bicarbonate that redeposits on the lace work of trona insolubles form such a barrier which is deposited on surfaces of the underground trona formation in contact with the aqueous solvent. This dissolution barrier would be expected to dramatically decrease the dissolving rate because the barrier effectively increases the thickness of the diffusion path through which aqueous solvent diffuses in and trona values diffuse out. The phenomena is described in detail in U.S. Pat. No. 3,184,287 issued to Gancy in column 1 to column 2, line 30, and is overcome in the Gancy patent by injecting, along with the aqueous solvent, a sodium hydroxide solution or other suitable basic material having a pH greater then sodium carbonate which reacts with the bicarbonate, thereby eliminating the dissolution barrier. The instant process does not employ any such basic additives to the solution, but the TA of the dissolving solution, nevertheless, increases to near saturation at the prevailing ground temperature for reasons which are not known. Such solution normally will contain a considerable excess of sodium carbonate, leaving a substantial amount of the less desirable sodium bicarbonate remaining underground.

In carrying out the instant process, a closed injection well is drilled to the underground mined-out area. This is accomplished by drilling and installing a small diameter well (for example, 5 inches in diameter) from the surface down into the mined-out area. Precautions should be taken to drill into the mined cavity or void rather than a pillar. The instant process is capable of working in mined-out areas where the pillars, roof and ceiling are intact or in areas where there has been partial collapse of the roof, pillars, and/or with floor heave or where some subsidence has occurred.

The mined-out area normally contains trona pillars and residual, unmined trona. The trona pillars are left to support the ceiling during the original mining. After mining, the trona pillars remain and slowly deform allowing gradual subsidence of the ceiling to control ground conditions as mining retreats. In addition to trona pillars and rubble after subsidence occurs, the mined-out area contains trona layers remaining in the ceiling and floor which are too close to shale beds surrounding the trona seam to mine economically. Such trona layers and the trona pillars provide the surface area necessary for dissolution of additional trona into the solution used to slurry the tailings, as described hereinafter.

The solution used to slurry up the tailings is normally obtained from waste process streams throughout the soda ash plant on the surface although plain water can be used. These waste streams plus any required make-up water yield a solution that contains on average, about 10% by weight of TA; that is, 10% by weight of dissolved sodium carbonate and/or sodium bicarbonate values. The solution is mixed with tailings in amounts sufficient to have a pumpable mixture. A slurry containing about 15% by weight of tailing solids has been found most suitable. More dilute slurries can be used, of course, but that increases the amount of solution required to be employed to handle the tailings. A more concentrated slurry makes handling and pumping of the slurry more difficult.

The slurry containing about 15% by weight solids, is then pumped down the cased injection well with a sufficient static head that the slurry disperses the tailings throughout the mined-out area. The deeper the well, the greater the natural static head it will have. The pumping pressure required will decrease with deeper wells, because the natural static head will supply most or all of the pressure required for proper tailings dispersal.

Upon being injected, the tailings settle to the bottom of the mined-out underground area where they originated and the solution used to slurry the tailings slowly migrates to the lowest level contacting trona as it goes. Such contact dissolves additional trona and the solution is enriched in TA values. A solution level that is very shallow, only a few inches, will dissolve and cut out the bottom of the remaining trona pillars and the overburden pressure will continue pushing the remaining pillars down into the solution. Thus, in time, all the trona in the pillars can be dissolved in a shallow liquor.

By introducing the tailings in slurry form and under sufficient static and/or velocity head, the tailings are dispersed over a much larger area than would be possible if the natural slope of the tailings formed a cone whose tip terminated at the discharge opening of the well casing and which would choke such well opening. In the instant process, the solid tailings underground in time form a truncated cone which can extend in a normal 8 foot high mining zone as far as about 1500 feet at its base, if the base is on a horizontal surface. The shape of the cone ranges from 2 to 3 degrees from horizontal at the discharge point where coarser particles settle, to 0.5 to 1 degree from horizontal where smaller, less dense particles and slimes settle out. If the floor is not horizontal, or the trona bed is sloped, the deposition area will be elongated down slope. If the slope of the trona bed exceeds 3 degrees, almost all of the slurry will run down hill to a more level area. In the event the mined-out area forms a basin, it is possible to completely fill the basin with tailings even if the injection well is not located in the center of the basin.

The trona tailings will retain, as residual moisture, about 30% of the solution used to slurry them and inject them underground. The excess will drain to the lowest available point underground that it can reach. Normally, this can be determined in advance based on topographical maps of the mined area. The solution is allowed to drain until it reaches an accessible area of the mine where it can be collected in a sump. Alternately, it can be diverted via ditches or embankments to a central area where it is collected.

The solution is then removed from the area, essentially free of insolubles, via a sump, and finally pumped to the surface for use in the manufacture of sodium chemicals, such as soda ash, in a processing plant. The solution may be put into a surface-heated, dissolving circuit where its TA values will be increased as it dissolves added mined trona to bring its concentration up to a fully saturated solution. If the "Sesquicarbonate Process" is being employed to produce soda ash, the solution can be fed directly to the dissolving circuit if carbon dioxide is also added to the system. If the "Monohydrate Process" is being employed, the liquor can be pretreated as by heating, liming or other means, to convert the bicarbonate values to carbonate before the solution is put into the dissolver circuit.

Referring now to the drawing, FIG. 1 illustrates diagrammatically an embodiment of the instant process in conjunction with the "Monohydrate Process" for the production of soda ash.

In this embodiment, a crude trona is calcined in calciner 10 to crude sodium carbonate which is conveyed by line 42 into the dissolver 43 wherein the sodium carbonate is dissolved in make-up water from line 53. The resulting crude sodium carbonate solution carrying the insoluble muds is passed from the dissolver 43 by line 44 to clarifier 45 wherein the insoluble muds are settled out and the clarified overflow passes through line 46 to filter 47.

The muds are removed from clarifier 45 by line 48 to a head tank 49 where they are thoroughly mixed with hard make-up water natural to the region and/or other plant solutions. The resulting mixture is passed by line 50 to the thickener 51. The softened water and the thickened muds, termed "tailings", are removed from the thickener 51 through line 52 for disposal. The softened water and dissolved TA values overflow from the thickener 51 flows through line 53 and is added to the dissolver 43 to provide softened water for dissolving the crude calcined trona.

The filtered sodium carbonate solution is passed through line 54 from the filter 47 to the crystallizers 55 wherein water is removed by evaporation, and a slurry of sodium carbonate monohydrate crystals is formed in the mother liquor. The vapors from the crystallizers may be discharged to the atmosphere or may be led by line 62 through condenser 64 to a spray pond, for example, from which the cool water is returned to the condenser. The crystal slurry is passed from the crystallizers 55 through line 56 to a centrifuge 57 wherein the mother liquor is separated from the sodium carbonate monohydrate crystals by settling and by centrifugation. The sodium carbonate monohydrate crystals are passed through line 58 to the calciner 59 where the sodium carbonate monohydrate crystals are calcined to soda ash. The mother liquor from the centrifuge 57 is recycled via line 60 to the crystallizer 55 after purging enough mother liquor to prevent the build-up of impurities, such as chlorides and sulfates.

The tailings in line 52 are mixed with waste process streams or water which are introduced through line 66. The resulting slurry, having a 15% by weight solids content and up to 10% TA, is pumped via pump 67 down a cased injection well 68 into a mined-out, underground area 69, containing residual pillars of trona 70. The tailings 71 disperse throughout the basin 69 and settle to the bottom. The solution used to slurry the tailings 72 separates and overflows the area 69. During its stay in the area 69, the solution 72 dissolves the trona in the area and increases its TA value. The solution is then collected and passed via line 73 to pump 74 where it is pumped to an exit well 75 and is returned via line 76 to the dissolver 43 via line 42. Any bicarbonate values present in the stream must be converted to carbonate values by heating, by adding lime to the solution or dissolver circuit, or other means not shown, since the dissolving circuit in the "Monohydrate Process" contains little or no bicarbonate. If desired, prior to adding the return solution to the monohydrate plant, the TA values can be pre-purified by crystallizing TA from the solution and sending such purified TA values to the monohydrate plant dissolving or evaporating circuit.

The same system can be employed in the "Sesquicarbonate Process" except that a preliminary calciner illustrated in the drawing as FIG. 10 is not employed and the recycle stream 76 can be returned to the dissolver circuit, preferably with carbonation, but without having to convert its bicarbonate values to carbonate. Obviously, in the "Sesquicarbonate Process" the crystal entity that is recovered is sodium sesquicarbonate, rather than sodium carbonate monohydrate.

Another embodiment is to place the recovered solution from the underground area in an evaporation pond. There the solution is concentrated by evaporation and sodium carbonate decahydrate crystals form. These crystals can be removed from the evaporation pond, by dredging or the like, separated from the mother liquor, heated until melted, and the resulting solution employed in the dissolver circuits or other portions of the monohydrate process. Alternately, the sodium carbonate decahydrate crystals may be calcined directly to form soda ash by the use of a fluid bed or other calcining means.

An example for carrying out the present invention is set forth below.

Insoluble tailings obtained from a thickener employed in the "Sesquicarbonate Process" were mixed with sufficient process water and plant waste solutions to yield a solution having a 10% by weight total alkali content, that is, a dissolved sodium carbonate and/or sodium bicarbonate content of 10% by weight, until a slurry of 15% by weight tailings was formed. Six hundred gallons per minute (600 gpm) of the tailing slurry was injected by pump into a cased injection well 1500 feet deep that fed into an underground mined-out area located in a trona seam and supported by trona pillars. The natural head was sufficient to disperse the tailings in the area without plugging the well opening underground. This injection of tailing slurry continued at the above rate for several months. Previously, some water was entering the mined-out area from aquifers below the trona bed and was removed at a rate of 175 gallons per minute. The underground tailings disposal system added an additional 400 gallons per minute to this flow, the injection volume was reduced about 200 gpm (about 60 gpm tailings solids and about 140 gpm of liquid) by settling out of the solids and the retained moisture. The liquor recovered from the area overflow had a total average TA of 17.5% since start-up of the tailings disposal project. The liquor is pumped from the underground area to the surface and then placed in an evaporation pond where it is concentrated. Sodium carbonate decahydrate crystals are recovered and used as an auxiliary feed to an existing soda ash plant to recover the TA values and convert them to soda ash. Currently, the system has been in operation for more than 9 months without problems, with the tailings distributed back underground where they originated. Dissolution of the underground trona by the solution has continued to occur at a constant rate to yield an overflow liquor averaging about 17.5% total alkali.

In the above example, the 17.5% TA solution, comprising primarily sodium carbonate and sodium bicarbonate values, can be used as a more economical source of sodium values than either the starting 10% TA solution or the mechanically mined ore. This solution can be readily concentrated and processed by any suitable means to obtain purified sodium-containing chemicals. Such processing can include such steps as evaporation, crystallization, cooling, carbonation, causticization and neutralization, depending upon the product desired, to yield sodium sesquicarbonate, soda ash, sodium bi-carbonate, hydrates thereof including the mono- and decahydrate of sodium carbonate, caustic soda and sodium salts such as sodium phosphates and sodium polyphosphates. The instant process is a very low cost mining method for recovering TA values and avoids excessive disturbances of the surface area and reduces eventual subsidence while providing on environmentally compatible means for storing tailings.

We claim:

1. Process for disposal of insoluble tailings underground, said tailings being derived from insolubles that remain when solubilizing uncalcined or calcined trona in the process of producing soda ash, comprising slurrying up the tailings with water or waste aqueous solutions of a salt selected from the group consisting of sodium carbonate, sodium bicarbonate and mixtures thereof, pumping said slurry into a well connected to an underground mined-out cavity in a trona bed with sufficient pressure to prevent build-up of tailings from plugging the bottom of the well opening, continuing to pump said tailings slurry into said cavity, dispersing and settling said tailings in said cavity, removing a liquor from said cavity whose concentration of a salt selected from the group consisting of sodium carbonate, sodium bicarbonate and mixtures thereof, has been increased and recovering said liquor enriched in said salt for use in the manufacture of sodium-containing chemicals.

2. Process of claim 1 wherein the slurry of tailings contains about 15% by weight of solids.

3. Process of claim 1 wherein said waste aqueous solutions used to slurry up said tailings contains about 10 weight percent of said salt.

4. Process of claim 1 wherein said liquor enriched in said salt contains on average about 17.5 weight percent of said salt.

5. Process of claim 1 wherein said liquor enriched in said salt is returned to the dissolving circuit of a "Sesquicarbonate Process" or "Monohydrate Process" soda ash plant.

6. Process of claim 1 wherein said liquor enriched in said salt is returned to an evaporation pond and said liquor, concentrated by evaporation, is recovered for use in the manufacture of soda ash.

* * * * *